United States Patent
Klee et al.

(10) Patent No.: US 12,322,992 B2
(45) Date of Patent: Jun. 3, 2025

(54) METHOD FOR THE ADAPTIVE RAPID CHARGING OF A BATTERY PACK

(71) Applicant: Robert Bosch GmbH, Stuttgart (DE)

(72) Inventors: Christoph Klee, Stuttgart (DE); Andreas Gonser, Wolfschlugen (DE); Marc-Alexandre Seibert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 451 days.

(21) Appl. No.: 17/442,268

(22) PCT Filed: Mar. 9, 2020

(86) PCT No.: PCT/EP2020/056157
§ 371 (c)(1),
(2) Date: Sep. 23, 2021

(87) PCT Pub. No.: WO2020/193106
PCT Pub. Date: Oct. 1, 2020

(65) Prior Publication Data
US 2022/0158471 A1    May 19, 2022

(30) Foreign Application Priority Data

Mar. 28, 2019    (DE) .................... 10 2019 204 370.4

(51) Int. Cl.
*H02J 7/00*    (2006.01)
(52) U.S. Cl.
CPC .... *H02J 7/007182* (2020.01); *H02J 7/00036* (2020.01)
(58) Field of Classification Search
CPC .................. H02J 7/007182; H02J 7/00036
See application file for complete search history.

(56) References Cited

U.S. PATENT DOCUMENTS

| | | | |
|---|---|---|---|
| 5,534,765 A | 7/1996 | Kreisinger et al. | |
| 2012/0296504 A1* | 11/2012 | Haraki | B60L 53/65 903/903 |

(Continued)

FOREIGN PATENT DOCUMENTS

| | | | | |
|---|---|---|---|---|
| CN | 1989675 B | * | 6/2011 | ................ B25F 5/00 |
| CN | 102934321 A | | 2/2013 | |

(Continued)

OTHER PUBLICATIONS

Machine Translation of CN-1989675-B (2011). (Year: 2011).*

(Continued)

*Primary Examiner* — Drew A Dunn
*Assistant Examiner* — Pamela J Jeppson
(74) *Attorney, Agent, or Firm* — Maginot, Moore & Beck LLP

(57) ABSTRACT

The disclosure is based on a method for the adaptive rapid charging of a battery pack, in particular of an interchangeable battery pack for electric machine tools, by way of a battery charger, wherein, in at least one method step, at least one charging parameter of the battery charger is adjusted depending on at least one parameter of the battery pack. It is proposed, in at least one method step, for the at least one charging parameter to be adjusted depending on at least one charging characteristic diagram that is typical for the battery, is stored in a storage unit of the battery pack and contains at least predefined values of a voltage, temperature and/or current suitable for a charging procedure for the battery pack.

14 Claims, 4 Drawing Sheets

(56) References Cited

U.S. PATENT DOCUMENTS

| | | |
|---|---|---|
| 2013/0162196 A1 | 6/2013 | Li |
| 2015/0372512 A1 | 12/2015 | Umemura et al. |
| 2016/0252582 A1* | 9/2016 | Iida ................... H01M 10/48 702/63 |
| 2017/0033587 A1* | 2/2017 | Hong ................. H02J 7/00034 |
| 2017/0288421 A1 | 10/2017 | Greening |
| 2018/0345800 A1* | 12/2018 | Beer ..................... B60L 53/18 |
| 2019/0084435 A1* | 3/2019 | Grace ................ H01M 10/441 |

FOREIGN PATENT DOCUMENTS

| | | |
|---|---|---|
| DE | 10 2014 200 684 A1 | 7/2015 |
| DE | 10 2016 012 996 A1 | 5/2018 |
| EP | 2 961 025 A1 | 12/2015 |
| WO | 96/10858 A1 | 4/1996 |
| WO | 2017/137234 A1 | 8/2017 |

OTHER PUBLICATIONS

International Search Report corresponding to PCT Application No. PCT/EP2020/056157, mailed Apr. 28, 2020 (German and English language document) (6 pages).

* cited by examiner

METHOD FOR THE ADAPTIVE RAPID CHARGING OF A BATTERY PACK

This application is a 35 U.S.C. § 371 National Stage Application of PCT/EP2020/056157, filed on Mar. 9, 2020, which claims the benefit of priority to Serial No. 10 2019 204 370.4, filed on Mar. 28, 2019 in Germany, the disclosures of which are incorporated herein by reference in their entirety.

BACKGROUND

A method for adaptive rapid-charging of a battery pack by means of a battery charger has already been proposed, wherein, in at least one method step, at least one charging parameter of the battery charger is adjusted depending on at least one parameter of the battery pack.

SUMMARY

The disclosure is based on a method for adaptive rapid-charging of a battery pack, in particular a removable battery pack for electric power tools, by means of a battery charger, wherein, in at least one method step, at least one charging parameter of the battery charger is adjusted depending on at least one parameter of the battery pack.

It is proposed that in at least one method step, the at least one charging parameter is adjusted, in particular by means of an open-loop and/or closed-loop control unit of the battery charger, depending on at least one battery-typical charging map, which is stored in a memory unit of the battery pack and comprises at least predefined values for a voltage, temperature and/or current suitable for a process for charging the battery pack.

The charging parameter is preferably in the form of a current, a voltage, a resistance, a time, the number of charging cycles, a voltage ratio, a capacitance, a charge, an internal resistance, or the like, which charging parameter in particular affects a process for charging the battery pack. Particularly preferably, the charging parameter is in the form of a charging current and/or a charging voltage of the battery charger used in particular to charge the battery pack. The parameter of the battery pack is preferably in the form of a voltage of the battery pack and/or of at least one battery cell of the battery pack, a resistance, in particular an internal resistance, of the battery pack and/or of the battery cell of the battery pack, a temperature of the battery pack and/or of the battery pack of the battery pack, or the like. In particular, the parameter is in the form of an input or output voltage of the battery pack and/or battery cell, an input or output temperature of the battery pack and/or battery cell, or a minimum or maximum charging current of the battery charger that is transferred to the battery pack. The input voltage of the battery pack and/or battery cell is preferably a voltage that lies across the battery pack and/or battery cell before a charging process has started, in particular in the absence of a charging current. The output voltage is preferably a voltage of the battery pack and/or battery cell that lies across the battery pack and/or battery cell during a charging process, in particular while a charging current is flowing from the battery charger to the battery pack and/or battery cell. The input temperature and the output temperature are advantageously temperatures of the battery pack and/or battery cell corresponding to before and after a charging process.

Preferably, the charging parameter is adjusted by means of the open-loop and/or closed-loop control unit of the battery charger depending on the parameter and the battery-typical charging map in such a way that a total charging time of the battery pack can be kept low. The total charging time of the battery pack is preferably a time needed to charge the battery pack by means of the battery charger from an initial state of charge to a predetermined final state of charge. Preferably, in at least one method step, a final state of charge is set and/or specified by a user and/or an external unit. The parameter of the battery pack is advantageously detected at the battery pack by means of a detection unit. The detection unit is preferably part of the battery charger. The parameter is preferably detected by means of at least one detection element of the detection unit, which detection element is in particular integral with a holding interface of the battery charger. At least part of the detection element is preferably in the form of an electrical contact. It is also conceivable, however, that at least part of the detection unit is part of the battery pack and/or of an external unit, wherein in particular the detected parameter is transferred to the battery charger, in particular to the open-loop and/or closed-loop control unit, by means of a communication unit of the battery charger, the battery pack and/or the external unit. It is also conceivable, however, that the parameter of a battery cell of the battery pack is detected by means of the detection unit, wherein in particular the charging parameter is adjusted depending on a detected value of the parameter of the battery cell of the battery pack. An "open-loop and/or closed-loop control unit" is intended to mean in particular a unit having at least one electronic control system. An "electronic control system" is intended to mean in particular a unit having a processor unit and having a memory unit, and also having an operating program, which is stored in the memory unit. Preferably, in the event that a detected value of the parameter in the form of a temperature exceeds 50° C., the charging process is terminated by means of the open-loop and/or closed-loop control unit.

The battery pack is advantageously in the form of a replaceable battery pack for electric power tools, and in particular comprises at least one battery cell. The battery cell is preferably in the form of a lithium-based battery cell, for instance a Li-ion battery cell, LiPo battery cell, or the like. It is conceivable that the method can also be applied to other battery cells. A battery voltage of the battery pack is preferably obtained from an interconnection of battery cells of the battery pack. The battery pack preferably has a battery voltage of 3.6 V, 7.2 V, 10.8 V, 14.4 V, 18 V, 36 V, or the like. An "electric power tool" is intended to mean in particular a device for machining workpieces by means of an electrically powered tool. For example, the electric power tool is a power drill, a screwdriver, a grinder, a saw, or the like.

Preferably, in at least one method step, in the event that a parameter in the form of a voltage exceeds a limit value, in particular having a value of at least 4.2 V, the battery pack is charged using a constant charging parameter in the form of the charging voltage (CV phase), in particular independently of the charging map. Preferably, in at least one method step, a charging parameter in the form of the charging current of the battery charger is detected by means of the detection unit in particular periodically or continuously. A process for charging the battery pack is preferably performed at a constant voltage (CV phase) until the charging parameter in the form of the charging current falls below a limit value. It is alternatively conceivable that the charging process is stopped in the event that the limit value of the parameter in the form of a voltage, in particular having a value of at least 4.2 V, is exceeded. It is also conceivable, however, that the charging process is stopped in the event that a parameter in the form of a voltage and/or temperature exceeds another limit value, which in particular is specified by a user and/or an external unit, and/or is stored in the memory unit of the battery pack and/or in the battery charger.

The battery-typical charging map is preferably in the form of a collection of data, for instance a digital library and/or a digital array object. The battery-typical charging map preferably depends on a design and/or type of the battery pack. It is conceivable that, stored in the memory unit of the battery pack, are a multiplicity of battery-typical charging maps, wherein in particular at least one battery-typical charging map of the multiplicity of battery-typical charging maps takes into account aging, in particular the number of charging cycles performed on the battery pack and/or a detected or stored variable internal resistance of the battery pack and/or battery cell. "Predefined values of a voltage, temperature and/or current suitable for a process for charging the battery pack" is intended to mean in particular that, in particular non-destructive, charging of the battery pack by the battery charger can be performed during a charging process for each of these values for the voltage, temperature and/or charging current. The battery-typical charging map advantageously comprises in each case at least one value range and/or a value for a voltage of the battery pack and/or battery cell of the battery pack, which voltage in particular is suitable for the process for charging the battery pack, for a temperature of the battery pack and/or battery cell of the battery pack, which temperature in particular is suitable for the process for charging the battery pack, and/or for a charging current of the battery charger, which charging current in particular is suitable for the process for charging the battery pack. Preferably, in at least one method step, for the purpose of adjusting the charging parameter, in particular by means of the open-loop and/or closed-loop control unit of the battery charger, at least one value of the parameter of the battery pack, which value is detected by the detection unit of the battery charger, is compared with at least one value range and/or value, assigned to the parameter, from the battery-typical charging map. The detected parameter is preferably compared by means of the open-loop and/or closed-loop control unit periodically or continuously with a value range and/or value, corresponding to the parameter, from at least one charging map stored in the memory unit of the battery pack.

The battery-typical charging map preferably comprises at least one value range and/or value for at least one parameter in the form of the input voltage of the battery pack and/or battery cell. The battery-typical charging map preferably comprises at least one value range and/or value for at least one parameter in the form of the output voltage of the battery pack and/or battery cell. The battery-typical charging map preferably comprises at least one value range and/or value for at least one parameter in the form of the input temperature of the battery pack and/or battery cell. The battery-typical charging map advantageously comprises at least one value range and/or value for at least one parameter in the form of the output temperature of the battery pack and/or battery cell. The battery-typical charging map preferably comprises at least one value range and/or value for at least one parameter in the form of the maximum charging current of the battery charger that can be transferred to the battery pack and/or battery cell. The battery-typical charging map preferably comprises at least one value range and/or value for at least one parameter in the form of the minimum charging current of the battery charger that can be transferred to the battery pack and/or battery cell. Particularly preferably, the battery-typical charging map has precisely one value range and/or precisely one value each for the input voltage, the output voltage, the input temperature, the output temperature and/or the charging current. The battery-typical charging map preferably has precisely one reference value for the charging parameter, wherein in particular a charging parameter is adjusted to the reference value of the charging parameter if, during a charging process, a detected value of the input voltage, of the output voltage, of the input temperature, of the output temperature and/or of the charging current lies within the associated value range from the charging map and/or equals the associated value from the charging map. The reference value of the charging parameter, in particular for a charging parameter in the form of the charging current, is preferably a reference value of the charging current of the battery charger. The reference value of the charging parameter, in particular for a charging parameter in the form of the charging voltage, is advantageously a reference value for the charging voltage of the battery charger. In particular, a battery-typical charging map given by way of example has a reference value for the charging current of 4 A per battery cell, an input temperature of 0° C., an output temperature of 50° C., an input voltage of 2.5 V per battery cell, and an output voltage of 4.1 V per battery cell. A further battery-typical charging map given by way of example preferably has a reference value for the charging current of 6 A per battery cell, an input temperature of 10° C., an output temperature of 50° C., an input voltage of 2.5 V per battery cell, and an output voltage of 4.2 V per battery cell. Other embodiments of the charging map are also conceivable, however. The charging parameter in the form of the charging current and/or charging voltage is preferably kept constant by means of the open-loop and/or closed-loop control unit until a charging map that differs from the battery-typical charging map is selected.

It is also conceivable that at least one further charging map is stored in the memory unit of the battery charger, and in particular in at least one method step is taken into account by the open-loop and/or closed-loop control unit to adjust the charging parameter. The further charging map is preferably taken into account to adjust the charging parameter, in particular by means of the open-loop and/or closed-loop control unit, if a fault in communication between the battery pack and battery charger and/or an unknown battery pack is registered, in particular by the open-loop and/or closed-loop control unit.

The embodiment of the method according to the disclosure can facilitate advantageously universal and adaptive charging of the battery pack, in particular because a charging process can be controlled by means of battery-specific charging maps stored in the battery pack. Advantageously rapid charging of the battery pack can be facilitated. Overheating of the battery pack during a charging process can be avoided as far as possible. The embodiment according to the disclosure can achieve advantageously high compatibility and versatility of a battery charger, in particular because charging parameters can each be provided by a battery pack to be charged by means of the charging map.

It is additionally proposed that in at least one method step for adjusting the charging parameter, the battery-typical charging map is selected from a multiplicity of battery-typical charging maps stored in the memory unit of the battery pack, in particular is selected by means of a, in particular wireless, communication unit, depending on at least the parameter of the battery pack detected by a detection unit. For the purpose of selecting the battery-typical charging map, at least one value of at least one parameter of the battery pack, which value is detected by the detection unit, is preferably compared in each case with at least one value range and/or value, assigned to the parameter, from the multiplicity of battery-typical charging maps. For the purpose of selecting the battery-typical charging map, the battery-typical charging maps that comprise a value range and/or value that is assigned to the at least one parameter and includes the detected value of the parameter are advantageously considered. The battery-typical charging map that has the highest reference value for the charging current is preferably selected for adjusting the charging parameter from the battery-typical charging maps considered. The battery-typical charging map is advantageously selected by means of the open-loop and/or closed-loop control unit, in particular by means of at least one algorithm held in a memory unit of the open-loop and/or closed-loop control unit, in particular automatically. The algorithm is preferably stored in the memory unit of the battery pack, the communication unit, the open-loop and/or closed-loop control unit and/or a memory unit of the battery charger, and/or can be retrieved therefrom. The algorithm is preferably designed to check in succession all the charging maps stored in the memory unit of the battery pack to determine whether value ranges and/or values, assigned to the parameter, from the charging maps include the detected value of the parameter. The algorithm is preferably designed such that all the charging maps that include the detected value of the parameter in a value range and/or value assigned to the parameter are sorted according to an assigned value of the charging parameter, in particular a reference value of the charging current, wherein the charging map that has a highest value of the charging parameter, in particular a highest reference value of the charging current, is selected by means of the algorithm. Preferably, in at least one method step, in particular after the battery-typical charging map is selected, the battery-typical charging map is transferred by means of the communication unit from the memory unit of the battery pack to the open-loop and/or closed-loop control unit of the battery charger. Preferably, in at least one step, in particular on connection of the battery pack to the battery charger, the open-loop and/or closed-loop control unit makes a request to the battery pack to transfer the battery-typical charging map. The memory unit of the battery pack is in particular in the form of a memory of a microcontroller of the battery pack or in the form of a separate memory unit of the battery pack. It is conceivable that the battery-typical charging map is stored, in particular by means of the open-loop and/or closed-loop control unit, in a memory unit of the battery charger at least temporarily. The transfer of the battery-typical charging map by means of the communication unit is preferably performed via at least one communication element of the communication unit via an electrical and/or electronic connection to the battery pack. At least part of the communication element is preferably in the form of an electrical contact, and in particular is integral with the holding interface of the battery charger. It is also conceivable, however, that the battery-typical charging map is transferred wirelessly by means of the communication unit, in particular via at least one further communication element of the communication unit. The battery-typical charging map is preferably transferred digitally. For example, the communication unit is a unit for near-field communication (NFC), a Bluetooth system, a radio system, a network adapter, or the like. The communication unit is preferably intended to connect the battery charger and/or the battery pack to an external unit. "Intended" shall be understood to mean in particular specifically configured, specifically designed and/or specifically equipped. An object being intended for a specific function shall be understood in particular to mean that the object fulfills and/or performs this specific function in at least one usage state and/or operating state. For example, the external unit is in the form of a mobile device, in particular a smartphone, in the form of a Cloud, a server, or the like. The communication unit is advantageously intended to connect the battery charger and/or the battery pack to the Internet and/or an intranet. At least part of the communication unit is preferably designed to be part of the battery charger. It is also conceivable, however, that at least part of the communication unit is designed to be part of the battery pack and/or of the external unit. Advantageously, in at least one method step, the external unit saves and/or overwrites via the communication unit the battery-typical charging map, in particular stored in the memory unit of the battery pack.

The embodiment of the method according to the disclosure can facilitate an advantageously versatile charging process, in particular because for each charging process a charging map can be selected that is determined and optimized by means of a detected parameter of the battery pack. In each case, an advantageously best charging map for the detected conditions at the battery pack can be selected for the charging process. Advantageously simple monitoring of charging processes can be implemented by the communication unit. Advantageously simple updating of charging maps can be facilitated.

It is also proposed that in at least one method step, in particular before a process for charging the battery pack has started, by means of a, in particular wireless, communication unit, at least more than one battery-typical charging map stored in the memory unit of the battery pack is selected from a multiplicity of battery-typical charging maps stored in the memory unit of the battery pack, depending on at least the parameter of the battery pack detected by a detection unit, and is stored at least temporarily in a memory unit of the battery charger. Preferably, the selected battery-typical charging maps are selected depending on at least one relevance, in particular with regard to a detected parameter compared with at least one value range and/or value, assigned to the parameter, from the battery-typical charging map, and/or with regard to a type and/or an aging characteristic value of the battery pack. Advantageously, at least some of the plurality of battery-typical charging maps are selected by means of the algorithm and/or a further algorithm from the multiplicity of battery-typical charging maps stored in the memory unit of the battery pack. The selected battery-typical charging maps are preferably stored in the memory unit of the battery charger until charging of the battery pack is terminated or comes to an end. It is also conceivable, however, that the selected battery-typical charging maps remain stored in the memory unit of the battery charger until a further selection of at least one battery-typical charging map stored in the memory unit of the battery pack. The embodiment of the method according to the disclosure can facilitate an advantageously rapid process for charging the battery pack, in particular because a plurality of possible and/or suitable battery-typical charging maps can already be stored in the battery charger, and the charging map can be changed free from any selection. An advantageously energy-efficient charging process can be achieved, in particular because selection can be performed by means of the communication unit easily at the beginning of the charging process, in which in particular more than one charging map can be used.

It is also proposed that in at least one method step, a charging map is selected from a multiplicity of charging maps stored in the memory unit of the battery pack, in particular is selected at regular time intervals in particular by means of the communication unit, depending on a value of the parameter of the battery pack, which value is detected by means of a, in particular the aforesaid, detection unit, which charging map specifies a highest and/or lowest value, in particular a reference value, of the charging parameter, and includes the value of the detected parameter. The battery-typical charging map is preferably selected from the multiplicity of charging maps stored in the memory unit of the battery pack depending on the reference value of the charging current from the charging maps, wherein the selected battery-typical charging map includes a highest and/or lowest reference value of the charging current. It is conceivable that the battery-typical charging map is selected by means of the algorithm and/or a further algorithm. The battery-typical charging map is preferably selected at time intervals of 20 s, for example. Another embodiment of the time intervals is also conceivable, however. The time intervals are preferably adjusted according to a state of charge of the battery pack, an aging characteristic value of the battery pack, and/or the number of charging maps stored in the memory unit of the battery pack, in particular adjusted by means of the open-loop and/or closed-loop control unit and/or the communication unit. It is alternatively or additionally conceivable that the time intervals can be set by a user and/or an external unit, in particular via the communication unit. The embodiment of the method according to the disclosure can achieve an advantageously rapid and/or protective charging process, in particular because it is possible to ensure an optimized charging parameter, in particular an optimized charging current, by means of the regularly evaluated charging maps during the charging process.

It is additionally proposed that in at least one method step, in particular between a changeover of two different battery-typical charging maps for adjusting the charging parameter, at least one temporary charging break takes place, in which the parameter, in particular a parameter in the form of the voltage, of the battery pack is detected by means of a detection unit. In the charging break, a charging parameter, in the form of the charging current, of the battery charger is advantageously interrupted at least temporarily, in particular for a time period of 1 s, for instance. A duration of the charging break is preferably adjusted according to a type of the battery charger, the detection unit and/or the aging characteristic value of the battery pack, in particular adjusted by means of the open-loop and/or closed-loop control unit and/or the communication unit. It is alternatively or additionally conceivable that the duration of the charging break can be set by a user and/or an external unit, in particular via the communication unit. Preferably, the detection unit detects during the charging break a parameter, in the form of the input voltage, of the battery pack and/or battery cell. It is conceivable that during the charging break, the communication unit checks whether a more suitable further charging map is present in the memory unit of the battery pack and/or of the battery charger, wherein said more suitable further charging map includes a higher value of the charging parameter than the charging map, and includes the value of the detected parameter. In particular, if a more suitable further charging map is present, the more suitable further charging map is selected, in at least one method step, for adjusting the charging parameter. The embodiment of the method according to the disclosure can make an advantageously effective selection of a charging map for adjusting the charging parameter, in particular because an input voltage can be taken into account.

In addition, it is proposed that in at least one method step, a value of the parameter of the battery pack is detected by means of a, in particular the aforesaid, detection unit, wherein the process for charging the battery pack is ended depending on a divergence of the detected value of the parameter from value ranges and/or values from all the battery-typical charging maps stored in the memory unit. Preferably, the divergence is ascertained and/or registered by means of the open-loop and/or closed-loop control unit and/or the communication unit. Advantageously, the charging process is ended if a divergence of the detected value of the parameter from the value ranges and/or the values from all the battery-typical charging maps stored in the memory unit is registered, in particular by means of the open-loop and/or closed-loop control unit and/or the communication unit. It is also conceivable, however, that at least one limit value for the divergence is stored in the memory unit of the battery pack and/or in the memory unit of the battery charger, wherein the charging process is ended if the divergence exceeds or falls below the limit value. A state of charge of the battery pack is preferably ascertained, in particular by means of the detection unit, when or after the charging process is ended. The open-loop and/or closed-loop control unit preferably compares the state of charge of the battery pack with a stored limit value, in particular with a limit value stored in the memory unit of the battery pack and/or of the battery charger. Advantageously, in the event of the limit value not being reached, the communication unit transfers a signal, in particular an electronic signal, to the battery pack and/or to an external unit, in particular in order to communicate insufficient coverage by charging maps of the battery pack. The embodiment of the method according to the disclosure can achieve advantageously simple control of the charging process. Advantageously high safety of the charging process can be facilitated, in particular because the charging process takes place only under conditions defined by the charging maps.

It is also proposed that in at least one method step, a value of the parameter of the battery pack is detected by means of a, in particular the, aforesaid detection unit, wherein, depending on a divergence of the detected value of the parameter from value ranges and/or values from all the battery-typical charging maps stored in the memory unit, an output unit outputs at least one audible, visual and/or haptic signal, and/or a, in particular wireless, communication unit transfers at least one signal to an external unit and/or the battery pack. Preferably, the divergence is ascertained and/or registered by means of the open-loop and/or closed-loop control unit and/or the communication unit. Advantageously, the audible, visual and/or haptic signal is output and/or the signal is transferred if a divergence of the detected value of the parameter from the value ranges and/or values from all the battery-typical charging maps stored in the memory unit is registered, in particular by means of the open-loop and/or closed-loop control unit and/or the communication unit. It is also conceivable, however, that at least one limit value for the divergence is stored in the memory unit of the battery pack and/or in the memory unit of the battery charger, wherein the audible, visual and/or haptic signal is output and/or the signal is transferred if the divergence exceeds or falls below the limit value. Preferably, if a detected parameter in the form of a temperature reaches a value of 50° C., the output unit outputs at least one visual, audible and/or haptic signal, and/or the communication unit transfers a signal to an external unit and/or the battery pack. The signal transferred to the external unit and/or the battery pack is advantageously in the form of a digital data packet, for instance a programming command, a database entry, or the like. The signal output by means of the output unit is preferably in the form of a speech sound, a signal tone, a light, a vibration, or the like. The external unit is preferably a mobile device, in particular a smartphone, a Cloud, a server, or the like. The signal advantageously includes additional information on the charging process, for instance an instantaneous charging current, an instantaneous temperature, an instantaneous voltage, a remaining charging time, in particular estimated and/or calculated by the open-loop and/or closed-loop control unit, an instantaneous state of charge of the battery pack, a currently selected charging map, or the like. A course of the charging process is preferably stored on the battery pack and/or the external unit by means of the signal. The embodiment of the method according to the disclosure can achieve an advantageously high degree of user-friendliness, in particular because a user can keep track of the charging process advantageously easily. Advantageously external monitoring of the charging process can be facilitated. Advantageously simple documentation and/or monitoring of the charging process can be achieved.

In addition, a battery charger for adaptive rapid-charging of a battery pack, in particular of a replaceable battery pack for electric power tools, is proposed for performing a method according to the disclosure, having at least one open-loop and/or closed-loop control unit and having at least one, in particular wireless, communication unit. The battery charger preferably comprises a detection unit, which is intended to detect periodically or continuously a parameter of the battery pack and/or of a battery cell of the battery pack. The detection unit is preferably intended to detect periodically or continuously a charging parameter, in particular a charging current flowing from the battery charger to the battery pack. The detection unit advantageously comprises at least one temperature sensor element such as a thermal imaging camera, a thermocouple, an infrared thermometer, or the like. The communication unit is preferably connected, in particular conductively, to the open-loop and/or closed-loop control unit. The communication unit is advantageously intended to transfer digital data to the battery pack and/or to an external unit. The battery charger preferably comprises at least one holding interface, which is designed to correspond at least in part with an interface of the battery pack. The battery charger is preferably connected electrically via the holding interface to the battery pack, in particular to at least one battery cell of the battery pack. The holding interface is preferably intended to connect the battery charger detachably to the battery pack in particular in a mechanical, frictional and/or interlocking manner. It is conceivable that the battery charger is part of a system, which system in particular comprises at least one battery pack that has a corresponding design to the battery charger. The system advantageously comprises at least one external unit, which communicates with the battery charger and/or the battery pack in particular by means of the communication unit. The embodiment of the battery charger according to the disclosure can perform an advantageously fast rapid-charging process that is specific to the battery pack.

The method and/or the battery charger according to the disclosure are not intended to be restricted to the usage and embodiment described above. In particular, the method according to the disclosure and/or the battery charger according to the disclosure can comprise, in order to fulfill a functionality described herein, individual elements, components and units and also method steps that differ in number from the number thereof stated herein. Furthermore, for the value ranges specified in this disclosure, values that lie inside the stated limits shall also be considered disclosed and can be used as required.

BRIEF DESCRIPTION OF THE DRAWINGS

The following description of the drawing reveals further advantages. Two exemplary embodiments of the disclosure are presented in the drawing. The drawing, the description and the claims contain numerous features in combination. A person skilled in the art will expediently also consider the features individually and combine them to form practical further combinations.

In which drawings.

DETAILED DESCRIPTION

Figure 1:
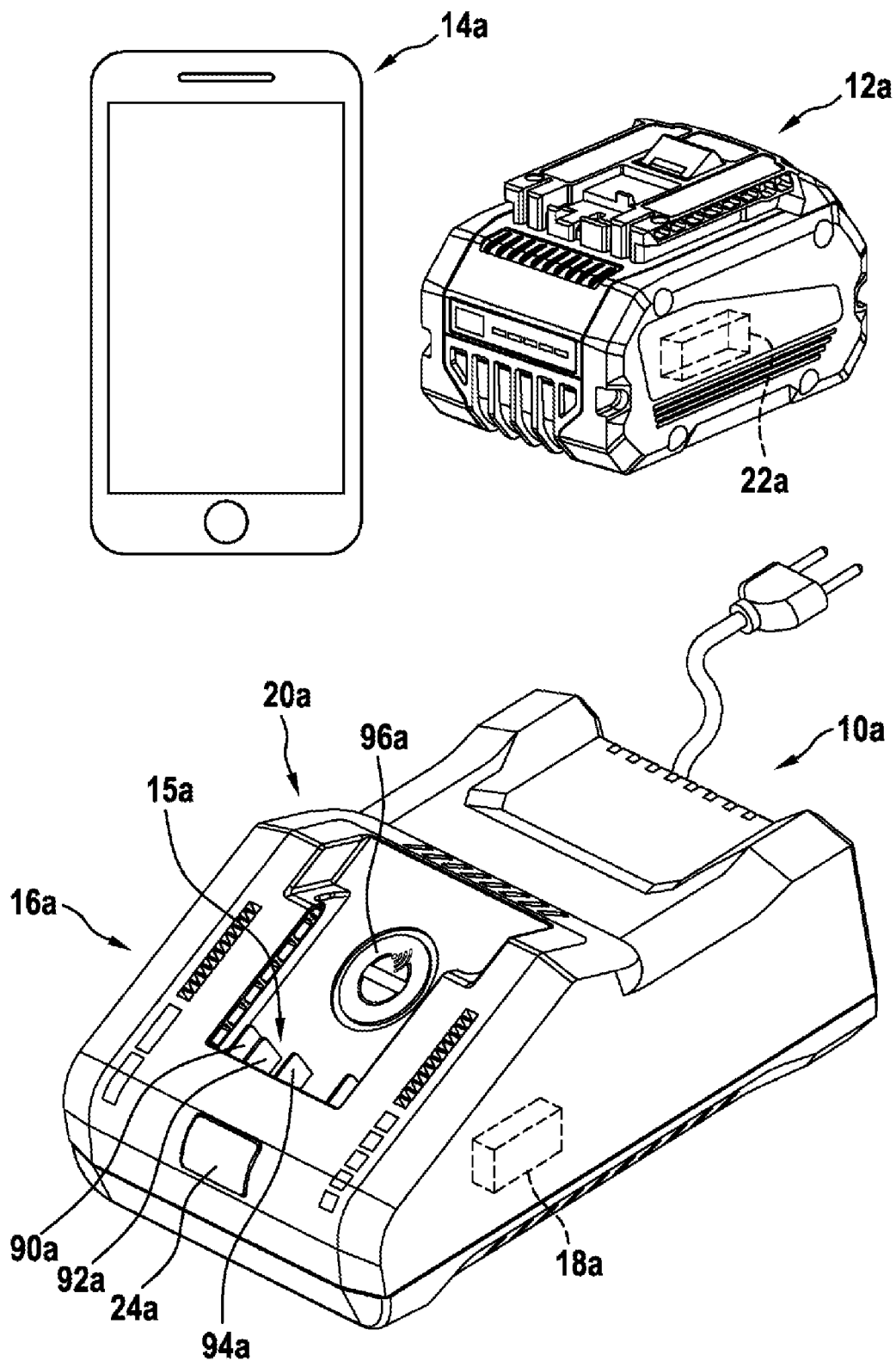
FIG. 1 is a schematic diagram of a system having at least one battery charger according to the disclosure for adaptive rapid-charging of a battery pack for performing a method according to the disclosure, which system comprises an external unit.

FIG. 1 shows a system having at least one battery charger 10a for adaptive rapid-charging of a battery pack 12a. The system preferably comprises the battery pack 12a, which is designed to correspond to a holding interface 15a of the battery charger 10a, and an external unit 14a in the form of a smartphone by way of example. The battery pack 12a is designed to be a replaceable battery pack for electric power tools. The battery charger 10a has at least one housing unit. The battery charger 10a comprises the holding interface 15a, which is designed to correspond at least in part with an interface of the battery pack 12a. The holding interface 15a comprises at least one contact element 90a for transferring at least one charging current from the battery charger 10a to the battery pack 12a. The battery charger 10a comprises a detection unit 16a, which is intended to detect continuously or periodically at least one parameter of the battery pack 12a, in particular of a battery cell of the battery pack 12a. The detection unit 16a is preferably intended to detect periodically or continuously a charging parameter, in particular a charging current, of the battery charger 10a. The detection unit 16a is advantageously arranged on a side of the housing unit that faces the holding interface 15a. It is also conceivable, however, that the battery pack 12a comprises the detection unit 16a. The detection unit 16a is preferably intended to detect in a temporary charging break, in particular between a changeover of two different battery-typical charging maps for adjusting the charging parameter, the parameter, in particular a parameter in the form of a voltage, of the battery pack 12a. The detection unit 16a comprises at least one detection element 92a for detecting the parameter of the battery pack 12a, which detection element is integral with the holding interface 15a. At least part of the detection element 92a is in the form of an electrical contact, which is connected to the battery pack 12a, in particular electrically and/or electronically, when the battery pack 12a is held for charging the battery pack 12a in the holding interface 15a. The detection element 92a is preferably in the form of a contact element of the holding interface 15a. Other embodiments of the detection unit 16a, in particular of the detection element 92a, are also conceivable, however. The battery charger 10a comprises an open-loop and/or closed-loop control unit 18a, which is intended to adjust the charging parameter of the battery charger 10a depending on the, in particular detected, parameter of the battery pack 12a, and to adjust the at least one charging parameter depending on at least one battery-typical charging map stored in a memory unit 22a of the battery pack 12a and comprising at least predefined values for a voltage, temperature and/or current suitable for a process for charging the battery pack 12a. The battery charger 10a comprises a communication unit 20a, which is intended, for the purpose of adjusting the charging parameter, to select, depending on at least the parameter of the battery pack 12a detected by the detection unit 16a, the battery-typical charging map from a multiplicity of battery-typical charging maps stored in the memory unit 22a of the battery pack 12a. Preferably, the communication unit 20a is intended to transfer, in particular after the battery-typical charging map has been selected, the battery-typical charging map from the memory unit 22a of the battery pack 12a to the open-loop and/or closed-loop control unit 18a of the battery charger 10a. The communication unit 20a advantageously has a communication element 94a, which is in the form of an electrical contact and is intended for an electrical and/or electronic connection to the battery pack 12a. The communication element 94a is integral with the holding interface 15a. The communication element 94a is preferably in the form of a contact element of the holding interface 15a. The communication element 94a is preferably connected to the battery pack 12a, in particular electrically and/or electronically, when the battery pack 12a is held for charging the battery pack 12a in the holding interface 15a. Other embodiments of the communication element 94a are also conceivable, however. The communication unit 20a has a further communication element 96a, which is intended for connecting the battery charger 10a wirelessly to the external unit 14a and/or the battery pack 12a. The further communication element 96a is preferably arranged on a side of the housing unit that faces the holding interface 15a. The communication unit 20a is preferably intended to select, in particular before a process for charging the battery pack 12a has started, depending on at least the parameter of the battery pack 12a detected by the detection unit 16a, at least more than one battery-typical charging map stored in the memory unit 22a of the battery pack 12a from a multiplicity of battery-typical charging maps stored in the memory unit 22a of the battery pack 12a, and to store same at least temporarily in a memory unit of the battery charger 10a, which memory unit is not shown in FIG. 1 and in particular may be part of the open-loop and/or closed-loop control unit. It is conceivable that the external unit 14a is intended to monitor a charging process and/or to store at least one battery-typical charging map in the memory unit 22a via the communication unit 20a. For example, the, in particular further communication element 96a, is an element for near-field communication (NFC), a Bluetooth element, a radio element, a network adapter, or the like. The communication unit 20a, in particular the further communication element 96a, is preferably intended to connect the battery charger 10a and/or the battery pack 12a to the external unit 14a. It is also conceivable that the external unit 14a and/or a further external unit is in the form of a differently designed mobile device, a Cloud, a Server, or the like, wherein in particular the communication unit 20a is intended to connect the battery charger 10a and/or the battery pack 12a to a network. The communication unit 20a, in particular the further communication element 96a, is preferably intended to connect the battery charger 10a and/or the battery pack 12a to the Internet and/or an intranet. It is alternatively or additionally conceivable that the communication unit 20a is intended to transfer a battery-typical charging map to the memory unit 22a from the external unit 14a and/or the further external unit, preferably depending on a type and/or identification number of the battery pack 12a, which in particular is detected by the detection unit 16a. The battery charger 10a comprises an output unit 24a, which is intended to output at least one audible, visual and/or haptic signal depending on a divergence of the detected value of the parameter from value ranges and/or values from all the battery-typical charging maps stored in the memory unit 22a.

Figure 2:
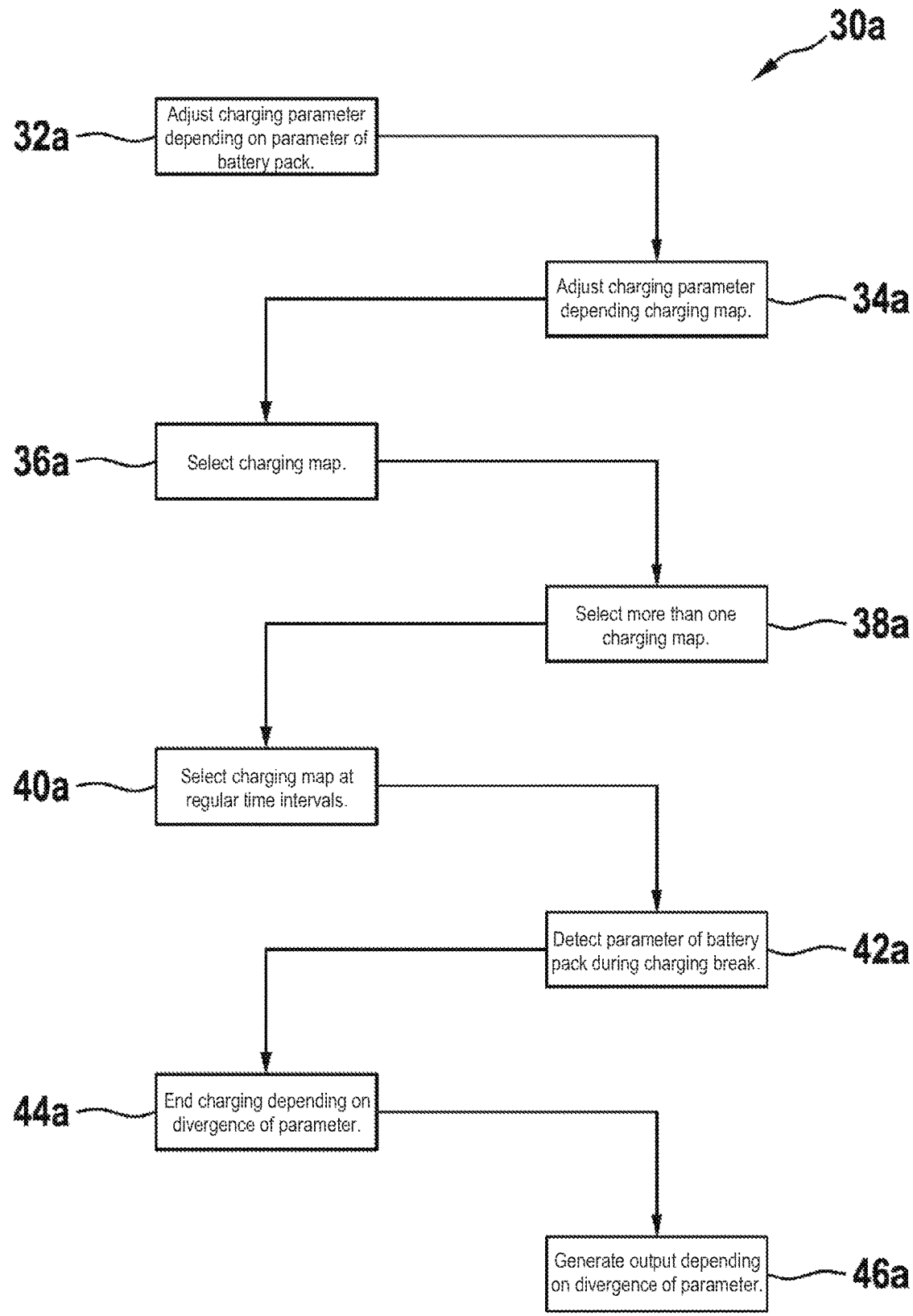
FIG. 2 is a schematic diagram of a sequence of the method according to the disclosure for adaptive rapid-charging of a battery pack.

FIG. 2 shows an example of a sequence of a method 30a for adaptive rapid-charging of the battery pack 12a. In at least one method step 32a of the method 30a, the at least one charging parameter of the battery charger 10a is adjusted depending on the at least one parameter of the battery pack 12a. In at least one further method step 34a of the method 30a, the at least one charging parameter is adjusted depending on the at least one battery-typical charging map which is stored in the memory unit 22a of the battery pack 12a and comprises at least predefined values for a voltage, temperature and/or current suitable for the process for charging the battery pack 12a. In at least one further method step 36a of the method 30a, for the purpose of adjusting the charging parameter, the battery-typical charging map is selected from a multiplicity of battery-typical charging maps stored in the memory unit 22a of the battery pack 12a, in particular by means of the, in particular wireless, communication unit 20a, depending on at least the parameter of the battery pack 12a detected by the detection unit 16a. In at least one further method step 38a of the method 30a, the, in particular wireless, communication unit 20a is used to select, depending on at least the parameter of the battery pack 12a detected by the detection unit 16a, at least more than one battery-typical charging map stored in the memory unit 22a of the battery pack 12a from a multiplicity of battery-typical charging maps stored in the memory unit 22a of the battery pack 12a, and to store same at least temporarily in the memory 22a unit of the battery charger 10a. In at least one further method step 40a of the method 30a, a charging map is selected from a multiplicity of charging maps stored in the memory unit 22a of the battery pack 12a, in particular is selected at regular time intervals, depending on a value of the parameter of the battery pack 12a, which value is detected by means of the detection unit 16a, which charging map specifies a highest value of the charging parameter and includes the value of the detected parameter. In at least one further method step 42a of the method 30a, in particular between a changeover of two different battery-typical charging maps for adjusting the charging parameter, at least one temporary charging break takes place, in which the parameter, in particular a voltage, of the battery pack 12a is detected by means of the detection unit 16a. In at least one further method step 44a of the method 30a, a value of the parameter of the battery pack 12a is detected by means of the detection unit 16a, wherein the process for charging the battery pack 12a is ended depending on a divergence of the detected value of the parameter from value ranges and/or values from all the battery-typical charging maps stored in the memory unit 22a. In at least one further method step 46a of the method 30a, a value of the parameter of the battery pack 12a is detected by means of the detection unit 16a, wherein, depending on a divergence of the detected value of the parameter from value ranges and/or values from all the battery-typical charging maps stored in the memory unit 22a, the output unit 24a outputs at least one audible, visual and/or haptic signal, and/or the, in particular wireless, communication unit 20a transfers at least one signal to the external unit 14a and/or the battery pack 12a.

Figure 3:
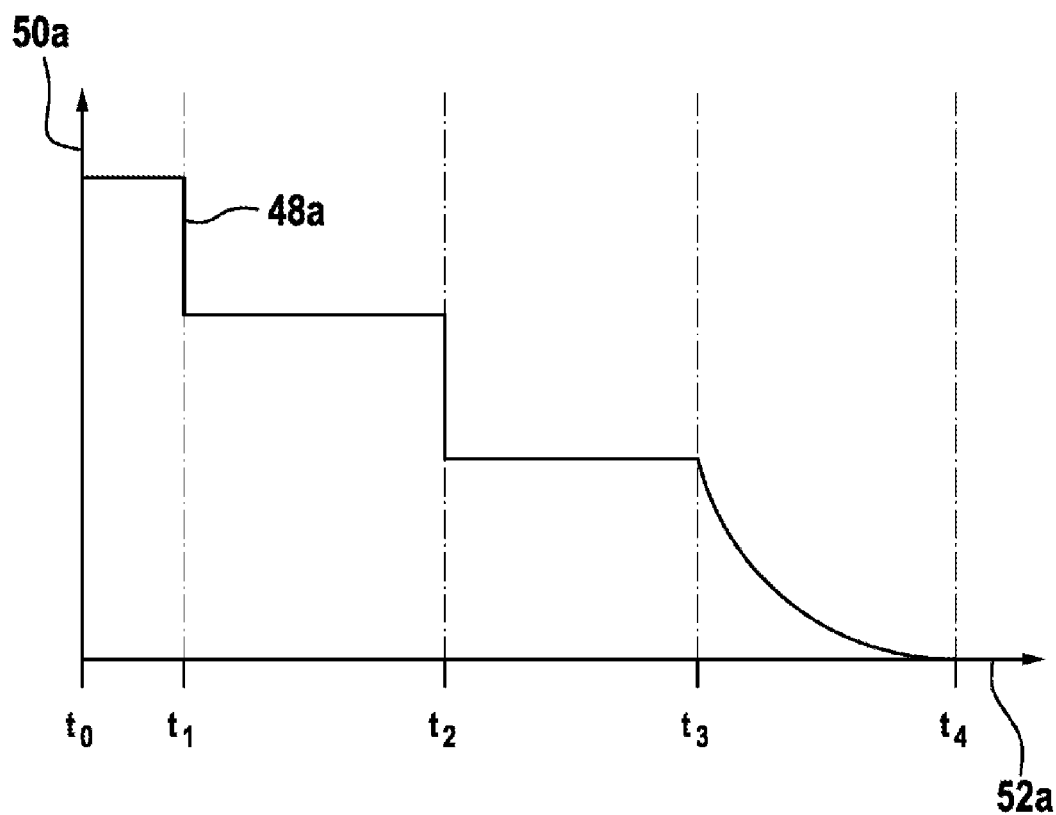
FIG. 3 is a schematic diagram of a curve of a charging current during an example charging process in accordance with the method according to the disclosure.

FIG. 3 shows a curve 48a of a charging parameter in the form of a charging current during an example process for charging the battery pack 12a by means of the battery charger 10a according to the method 30a. The charging parameter in the form of the charging current is plotted on the vertical axis 50a. The horizontal axis 52a represents the time. The process for charging the battery pack 12a preferably starts at a time t0, wherein a first battery-typical charging map stored in the memory unit 22a of the battery pack 12a is selected by the communication unit 20a. The first battery-typical charging map preferably comprises a first reference value of the charging current, wherein at time t0, the charging parameter of the battery charger 10a in the form of the charging current is adjusted according to the reference value of the charging current, and kept constant until a time t1. Advantageously, at time t1, the detection unit 16a detects a value of a parameter, in particular of the voltage and/or the temperature of the battery pack 12a and/or of a battery cell of the battery pack 12a, which value lies outside a value range, assigned to the parameter, from the first charging map. In particular at time t1, depending on the detected value of the parameter of the battery pack 12a, a second charging map is selected from a multiplicity of charging maps stored in the memory unit 22a of the battery pack 12a, which charging map specifies a highest value of the charging parameter, in particular a highest reference value of the charging current, and includes the value of the detected parameter. The charging parameter in the form of the charging current is preferably adjusted at time t1 according to the reference value of the charging current from the second charging map, and kept constant until a time t2. Preferably, at time t2, the detection unit 16a detects a further value of the parameter, in particular of the voltage and/or the temperature of the battery pack 12a and/or of a battery cell of the battery pack 12a, which value lies outside a value range, assigned to the parameter, from the second charging map. Advantageously, at time t2, depending on the detected further value of the parameter of the battery pack 12a, a third charging map is selected from a multiplicity of charging maps stored in the memory unit 22a of the battery pack 12a, which charging map specifies a highest value of the charging parameter, in particular a highest reference value of the charging current, and includes the further value of the detected parameter. In particular, the charging parameter in the form of the charging current is adjusted at time t2 according to the reference value of the charging current from the third charging map, and kept constant until a time t3. Preferably, at time t4, the detection unit 16a detects a value of a parameter in the form of a voltage of the battery pack 12a and/or of the battery cell, which value exceeds a limit value of the voltage. Preferably, the battery pack 12a is charged from time t3 until a time t4 at a voltage that is held constant, until a charging parameter of the battery charger 10a in the form of the charging current falls below a limit value of the charging current, whereby in particular the charging process is ended.

Figure 4:
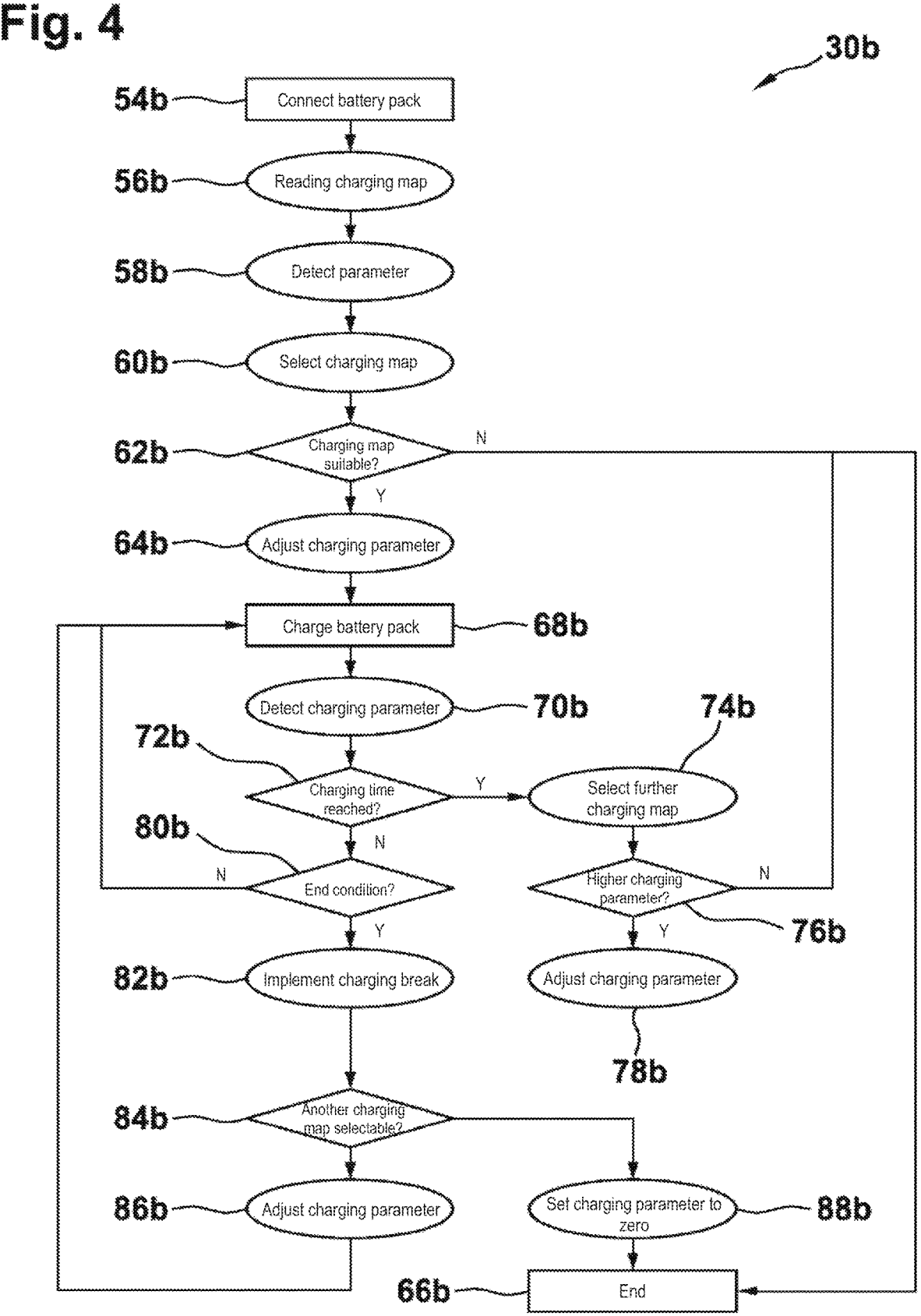
FIG. 4 is a schematic diagram of a sequence of an alternative embodiment of the method according to the disclosure for adaptive rapid-charging of a battery pack.

FIG. 4 shows a further exemplary embodiment of the disclosure. The following descriptions and the drawings are confined largely to the differences between the exemplary embodiments, wherein reference can be made generally also to the drawings and/or the description of the other exemplary embodiment, in particular to FIGS. 1 to 3, regarding identically denoted components and/or method steps, in particular regarding components and/or method steps having the same reference signs. In order to distinguish between the exemplary embodiments, the letter a is placed after the exemplary embodiment in FIGS. 1 to 3. In the exemplary embodiment of FIG. 4, the letter a is replaced by the letter b.

FIG. 4 shows a sequence of an alternative embodiment of a method 30b. In particular in at least one method step 32b (not shown in FIG. 4) of the method 30b, at least one charging parameter of a battery charger 10b is adjusted depending on at least one parameter of a battery pack 12b. Advantageously, in at least one method step 34b (not shown in FIG. 4) of the method 30b, the at least one charging parameter is adjusted depending on at least one battery-typical charging map which is stored in a memory unit 22b of the battery pack 12b and comprises at least predefined values for a voltage, temperature and/or current suitable for a process for charging the battery pack 12b. In at least one method step 54b of the method 30b, the battery pack 12b is preferably connected to the battery charger 10b. In at least one further method step 56b of the method 30b, in particular before a process for charging the battery pack 12b has started, at least more than one battery-typical charging map of the battery pack 12b is read from the memory unit 22b of the battery pack 12b by means of a, in particular wireless, communication unit 20b. In at least one further method step 58b of the method 30b, at least one parameter, in particular a voltage and/or a temperature, of the battery pack 12b and/or of a battery cell of the battery pack 12b is advantageously detected by a detection unit 16b. In at least one further method step 60b of the method 30b, at least one of the read battery-typical charging maps is selected by the communication unit 20b and/or an open-loop and/or closed-loop control unit 18b, in particular by means of an algorithm, depending on at least the parameter of the battery pack 12b detected by the detection unit 16b. Alternatively, in at least one method step of the method 30b, in particular in the method step 60b, for the purpose of adjusting the charging parameter, the battery-typical charging map is selected depending on at least the parameter of the battery pack 12b detected by a detection unit 16b, in particular is selected by means of the communication unit 20b, from a multiplicity of battery-typical charging maps stored in the memory unit 22b of the battery pack 12b. Preferably, in at least one further method step 62b of the method 30b, the open-loop and/or closed-loop control unit 18b checks, in particular depending on at least one value range from the selected charging map, whether the selected charging map is suitable for charging the battery pack 12b. Preferably, in at least one further method step 64b of the method 30b, if the selected charging map is suitable for charging the battery pack 12b, a charging parameter, in particular in the form of the charging current, is adjusted according to a reference value, associated with the charging parameter, from the charging map. If the selected charging map is unsuitable for charging the battery pack 12b, the charging process is preferably ended, in at least one further method step 66b of the method 30b. In at least one further method step 68b of the method 30b, the battery pack 12b is advantageously charged by the battery charger 10b by means of the adjusted charging parameter. Preferably, in at least one further method step 70b of the method 30b, the charging parameter is detected by means of the detection unit 16b in particular periodically or continuously. In particular, in at least one further method step 72b of the method 30b, the open-loop and/or closed-loop control unit 18b checks whether a predefined charging time has been reached. In at least one further method step 74b of the method 30b, if the predefined charging time has been reached, at least one further charging map of the read battery-typical charging maps is selected by the communication unit 20b and/or an open-loop and/or closed-loop control unit 18b, in particular by means of an algorithm, depending on at least the parameter of the battery pack 12b detected by the detection unit 16b. Preferably, in at least one further method step 76b of the method 30b, the open-loop and/or closed-loop control unit 18b checks whether the further selected charging map has a higher value of the charging parameter, in particular a higher value of the reference value of the charging current, than the selected charging map. Preferably, if the further selected charging map has a higher value of the charging parameter, in particular a higher reference value of the charging current, than the selected charging map, in at least one further method step 78b of the method 30b, the charging parameter, in particular the charging parameter in the form of the charging current, of the battery charger 10b, is adjusted according to a reference value of the charging current from the further selected charging map, which reference value is associated with the charging parameter. Preferably, if the further selected charging map has a lower value of the charging parameter, in particular a lower reference value of the charging current, than the selected charging map, in at least one further method step of the method 30b, in particular in the method step 68b, the battery pack 12b is charged further by the battery charger 10b by means of the adjusted charging parameter. In at least one further method step 80b of the method 30b, if the predefined charging time has not been reached, the open-loop and/or closed-loop control unit 18b checks an end condition in the charging map. Preferably, the end condition is that of reaching a limit value of the parameter in the form of a voltage, temperature or charging current, and/or reaching a state of charge of the battery pack 12b and/or exceeding a value range of a parameter from the charging map. If the end condition is not satisfied, in at least one further method step of the method 30b, in particular in the method step 68b, the battery pack 12b is preferably charged further by the battery charger 10b by means of the adjusted charging parameter. Advantageously, if the end condition is satisfied, in at least one further method step 82b of the method 30b, the open-loop and/or closed-loop control unit 18b implements at least one charging break, in which the charging parameter, in particular the charging parameter in the form of the charging current, is set to zero. Preferably, in at least one further method step 84b of the method 30b, for the purpose of adjusting the charging parameter, a check is performed to ascertain whether, depending on at least the parameter of the battery pack 12b detected by the detection unit 16b, another battery-typical charging map can be selected from the read battery-typical charging maps and/or the charging maps stored in the memory unit 22b, wherein a detected value of the parameter lies within a value range, assigned to the parameter, from a charging map. Preferably, in at least one further method step 86b of the method 30b, if another charging map can be selected, the charging parameter, in particular the charging parameter in the form of the charging current, of the battery charger 10b, is adjusted according to a reference value of the charging current from the charging map, which reference value is associated with the charging parameter. Preferably, in at least one further method step 88b of the method 30b, if none of the read and/or stored charging maps are suitable, in particular if the detected value of the parameter lies outside values ranges, assigned to the parameter, from all the charging maps, the charging parameter, in particular the charging parameter in the form of the charging current, is set to zero by the open-loop and/or closed-loop control unit 18b. Advantageously, in at least one further method step of the method 30b, in particular in the method step 66b, the charging process is ended.

The invention claimed is:

1. A method for adaptive rapid-charging of a battery pack using a battery charger, the battery pack being a replaceable battery pack configured for use with electric power tools, the method comprising:
   causing at least one charging break to take place during which a value of a voltage of the battery pack is detected using a detection unit;
   selecting at least one battery-typical charging map from a plurality of battery-typical charging maps stored in a memory unit of the battery pack depending on the value of the voltage of the battery pack; and
   adjusting at least one charging parameter of the battery charger depending on (i) the value of the voltage of the battery pack and (ii) the at least one battery-typical charging map,
   wherein the each of the plurality of battery-typical charging maps include a plurality of predefined reference values for the at least one charging parameter, the at least one charging parameter including at least one of (i) a voltage, (ii) a temperature, and (iii) a current, which are suitable for a process of charging the battery pack, each of the plurality of battery-typical charging maps being associated with a different respective predefined value range for the voltage of the battery pack,
   wherein the at least one battery-typical charging map is selected depending on the value of the voltage being within the respective predefined value range, and
   wherein the at least one charging break takes place between a changeover of two different battery-typical charging maps used to adjust the at least one charging parameter.

2. The method as claimed in claim 1, the selecting further comprising:
   selecting at least two battery-typical charging maps stored in the memory unit of the battery pack from the plurality of battery-typical charging maps stored in the memory unit of the battery pack, depending on the value of the voltage of the battery pack; and
   storing, at least temporarily, the at least two battery-typical charging maps in a memory unit of the battery charger.

3. The method as claimed in claim 2, wherein the at least two battery-typical charging maps are selected before the process of charging the battery pack has started.

4. The method as claimed in claim 2, wherein the at least two battery-typical charging maps are selected using wireless communication unit.

5. The method as claimed in claim 1, further comprising:
   selecting the at least one battery-typical charging map from the plurality of battery-typical charging maps stored in the memory unit of the battery pack depending on the value of the voltage of the battery pack, the selected at least one battery-typical charging map specifying a highest value of the at least one charging parameter and including the value of the at least one detected parameter.

6. The method as claimed in claim 5, wherein the charging map is selected at regular time intervals.

7. The method as claimed in claim 1, further comprising: ending the process of charging the battery pack depending on a divergence of the detected value of the voltage from value ranges from all of a plurality of battery-typical charging maps stored in the memory unit.

8. The method as claimed in claim 1, further comprising: depending on a divergence of the detected value of the voltage from value ranges from all of a plurality of battery-typical charging maps stored in the memory unit, at least one of:
  outputting, with an output unit, at least one of (i) an audible signal, (ii) a visual signal and (iii) a haptic signal; and
  transferring, with a communication unit, at least one signal to at least one of an external unit and the battery pack.

9. The method as claimed in claim 8, wherein the communication unit is a wireless communication unit.

10. The method as claimed in claim 1, wherein the at least one battery-typical charging map is selected using a wireless communication unit.

11. A battery charger for adaptive rapid-charging of a battery pack, the battery charger comprising:
  at least one communication unit; and
  at least one controller, the controller being at least one of an open-loop control unit and a closed-loop control unit, the at least one controller being configured to:
    cause at least one charging break to take place during which a value of a voltage of the battery pack using a detection unit;
    select at least one battery-typical charging map from a plurality of battery-typical charging maps stored in a memory unit of the battery pack depending on the value of the voltage of the battery pack; and
    adjust at least one charging parameter of the battery charger depending on (i) the value of the voltage of the battery pack and (ii) the at least one battery-typical charging map,
  wherein the each of the plurality of battery-typical charging maps include a plurality of predefined reference values for the at least one charging parameter, the at least one charging parameter including at least one of (i) a voltage, (ii) a temperature, and (iii) a current, which are suitable for a process of charging the battery pack, each of the plurality of battery-typical charging maps being associated with a different respective predefined value range for the voltage of the battery pack,
  wherein the at least one battery-typical charging map is selected depending on the value of the voltage being within the respective predefined value range, and
  wherein the at least one charging break takes place between a changeover of two different battery-typical charging maps used to adjust the at least one charging parameter.

12. The battery charger as claimed in claim 11, wherein the battery pack is a replaceable battery pack configured for use with electric power tools.

13. The battery charger as claimed in claim 11, wherein the communication unit is a wireless communication unit.

14. A method for adaptive rapid-charging of a battery pack using a battery charger, the battery pack being a replaceable battery pack configured for use with electric power tools, the method comprising:
  causing at least one charging break to take place during which a value of a voltage of the battery pack using a detection unit;
  transmitting a plurality of battery type-specific charging maps to the battery charger using a communication unit of the battery pack and storing the plurality of battery type-specific charging maps at least temporarily in a memory unit of the battery charger; and
  adjusting at least one charging characteristic of the battery charger depending on the value of the voltage of the battery pack and further depending on the plurality of battery type-specific charging maps stored in the memory unit of the battery pack, which have at least predetermined values for a suitable voltage, temperature, and current for a charging process of the battery pack, one of the plurality of battery type-specific charging maps being selected by the battery charger depending on the voltage of the battery pack, the at least one charging characteristic being selected based on the selected battery type-specific charging map,
  wherein the at least one charging break takes place between a changeover of two different battery-typical charging maps used to adjust the at least one charging characteristic.

* * * * *